United States Patent [19]

Ward, Jr.

[11] 4,373,960
[45] Feb. 15, 1983

[54] ASPHALT COMPOSITIONS AND METHOD FOR PAVING

[76] Inventor: Arthur T. Ward, Jr., 4 Blythewood Rd., Baltimore, Md. 21210

[21] Appl. No.: 205,151

[22] Filed: Nov. 10, 1980

[51] Int. Cl.³ .............................................. C08L 95/00
[52] U.S. Cl. ............................. 106/281 R; 106/273 R
[58] Field of Search ........................ 106/281 R, 273 R

[56] References Cited

U.S. PATENT DOCUMENTS

| 2,012,496 | 8/1935 | Carroll | 106/31 |
|---|---|---|---|
| 2,855,319 | 10/1958 | McConnaughay | 106/123 |
| 3,276,888 | 10/1966 | Rhodes | 106/277 |
| 3,276,890 | 10/1966 | Reese | 106/283 |
| 3,783,000 | 1/1974 | Takase et al. | 117/21 |
| 3,855,167 | 12/1974 | Bowman | 260/28 |
| 3,867,162 | 2/1975 | Elste, Jr. | 106/277 |
| 3,883,628 | 5/1975 | Martin | 264/54 |
| 3,894,724 | 7/1975 | McConnaughay | 259/158 |
| 3,904,428 | 9/1975 | McConnaughay | 106/278 |
| 3,905,823 | 9/1975 | Piskoti | 106/38.22 |
| 3,923,537 | 12/1975 | Wood | 106/277 |
| 4,154,619 | 5/1979 | Pronk | 106/281 R |
| 4,184,880 | 1/1980 | Huber et al. | 106/15.05 |
| 4,211,575 | 7/1980 | Burris | 106/274 |

OTHER PUBLICATIONS

The Asphalt Handbook, 1962 Ed., pp. 4, 5, 56, 57, 58 and 59.

Primary Examiner—John Kight, III
Assistant Examiner—Amelia B. Yarbrough
Attorney, Agent, or Firm—Spencer & Kaye

[57] ABSTRACT

An asphalt binder composition useful with mineral aggregate particles to form a patching composition for the repair of roads. The asphalt binder composition comprises: (1) a medium curing liquid asphalt, (2) from about 0.1 to 13.5% by weight tall oil based on the weight of the medium curing liquid asphalt, and (3) 0.0001% to 0.05% by volume of organopolysiloxane fluid, based on the volume of medium curing liquid asphalt plus tall oil. A patching composition is also provided which comprises from about 3 to 8% of asphalt binder composition, defined above, and from about 97 to 92% by weight of a mineral aggregate, based on the weight of asphalt binder composition plus mineral aggregate. A coating or sealing composition comprises: (1) a rapid curing liquid asphalt and (2) from about 0.1 to 13.5% by weight tall oil, preferably 1% by weight tall oil, based on the weight of rapid curing liquid asphalt. Methods are provided for preparing the compositions and for repairing roadways.

28 Claims, No Drawings

ASPHALT COMPOSITIONS AND METHOD FOR PAVING

BACKGROUND OF THE INVENTION

1. Field of the Invention

The present invention relates to asphalt patching, paving or repair compositions, sealing or coating compositions, a method for making the compositions, and a method for repairing, paving or patching roadways, such as asphaltic surfaces. The compositions and methods are applicable particularly to repairing or patching potholes, and the like, usually caused by weather and temperature variations and to repairing utility cuts in roadways. More particularly, the present invention relates to asphalt compositions that can be packaged and used for small road repairs or can be stored in bulk stock piles, and used for the desired repairs without on-site heating or other thermal control of the asphalt compositions.

2. Description of the Prior Art

Numerous disadvantages are associated with prior art methods and asphalt compositions generally used for the patching of roads and other surfaces. Hot asphalt compositions that are generally used in patching roads become stable upon cooling. In order to prevent the premature cooling of such compositions prior to use, special equipment is not only required to produce these compositions, but also to transport these compositions, in a heated state, to the site of a repair. It is necessary to maintain the compositions at the desired elevated temperature until the completion of the job, resulting in considerable labor and other expenses for the exercise of thermal control. Further, transportation of these heated mixtures is limited by traffic conditions and weather conditions, such as rain and snow.

Once at the working site, the hot asphalt compositions must be maintained at the proper temperature until used. When used in a patching operation, a crew of, for example, four to seven skilled personnel are required for the raking, hot ironing, tamping and subsequent hot-rolling of the composition so that the composition is softened and satisfactorily secured to the existing roadway being repaired. Another drawback with such hot asphalt compositions is that these compositions cannot be used in patching operations while raining or snowing because the rain or snow tends to abnormally cool the hot compositions and prevents the hot compositions from satisfactorily adhering to the roadway. Further, such hot mixes are generally transported in full truckloads to the site of a repair in order to conserve heat. Quite often, much of the material becomes too cold and therefore too hard to use and is therefore wasted. Additional costs are thereby incurred for the asphalt not used as well as the disposal of the asphalt.

A still further serious drawback in the use of the prior art patching compositions relates to the expansion and contraction of the patches due to changes in weather and temperature conditions which facilitates the introduction of water beneath the patch and surrounding roadway. If water seeps through the patched area, it will spread to the base and sub-base of the roadway, causing continuing disintegration of the roadway as a result of the perma-frost effect, leading to more extensive repairs and an attendant increase in costs for repairing the road.

Cold asphalt mixes containing cut-back asphalts, slow-curing asphalts and emulsified asphalts which can be stock-piled are in common use today. These mixtures depend upon the evaporation of solvents or water to cause sufficient hardening to prevent displacement under traffic. Quite often, however, these cold patches are displaced by traffic before complete hardening is achieved, resulting in the need for the additional application of a cold patching composition at the repair site. In addition, cold asphalt mixes, such as those in the form of emulsions, are generally not stable over long periods of time and generally must be used shortly after the preparation thereof to prevent the separation of the ingredients of the compositions. An example of an asphalt composition in the form of an emulsion containing water is disclosed in U.S. Pat. No. 3,867,162 to Elste, Jr.

A need therefore exists for a patching composition that is capable of overcoming the various disadvantages associated with various prior art compositions.

SUMMARY OF THE INVENTION

It is therefore a primary object of the present invention to provide a coated aggregate useful as a patching composition for roads that facilitate instant, permanent and economical road repairs in a simple and efficient manner.

Consistent with this primary object, it is also an important object of the present invention to provide a patching composition that can be used year round, under extreme temperature conditions, from below 0° to above 100° F. without the need of heating or maintaining the composition at an elevated temperature just prior to use. Such compositions remain sufficiently workable, even during cold temperature conditions, to be removed from a stock pile and worked into the surface area being repaired.

Another object of the present invention is to provide a patching composition that can be packaged in bags or other low-cost containers, in small or large quantitites, facilitating both short-term and long-term storage of the composition and ease of transportability to the repair site.

A further object of the present invention is to provide a composition that exhibits a shelf life of greater than one year, even when exposed to air, sun, light and rain.

Still another object of the present invention is to provide a road repair or patching composition that flows freely, is self-feathering and self-adhering and capable of adhering to bituminous surfaces, especially asphalt surfaces, bituminous concrete surfaces or other surfaces such as concrete, steel, earth or wooden surfaces, both under wet and dry weather conditions.

A still further object of the present invention is to provide a patching composition that does not require skilled labor or expensive machinery, including rollers, for the filling of a discontinuity in a roadway.

Other objects of the present invention are to provide an asphalt binder composition which can be mixed with aggregate to form the patching or paving composition, a coating or sealing composition which can be applied to the roadway before application of the patching composition, and methods for preparing and applying the various compositions.

Additional objects and advantages of the present invention will be set forth in the description which follows and in part will be obvious from the description or can be learned by practice of the invention. The objects and advantages are achieved by means of the compositions, processes, instrumentalities and combinations particularly pointed out in the appended claims.

To achieve the foregoing objects and in accordance with its purpose the present invention relates to an asphalt binder composition useful with mineral aggregate particles to form a patching composition for the repair of roads. The asphalt binder composition comprises: (1) a medium curing liquid asphalt, (2) from about 0.1 to 13.5% by weight tall oil based on the weight of the medium curing liquid asphalt, and (3) 0.0001% to 0.05% by volume of organopolysiloxane fluid, based on the volume of medium curing liquid asphalt plus tall oil.

In another embodiment of the present invention there is provided a patching composition which comprises from about 3 to 8%, preferably 5.25 to 7% by weight of asphalt binder composition, defined above, and from about 97 to 92%, preferably 94.75 to 93% by weight of a mineral aggregate, based on the weight of asphalt binder composition plus mineral aggregate.

The asphalt binder composition is generally prepared by initially mixing together the various ingredients of the asphalt binder composition at a temperature sufficient to cause the composition to flow. Generally, temperatures of between about 120° and 200° F. are used. Preferably, the temperature should not exceed 170° F. when working with a medium cure liquid asphalt of designation Mc-800. Thereafter, and while still hot, the liquid asphalt binder composition is mixed with the mineral aggregate to coat the aggregate particles and form the patching composition.

The present invention also provides a coating or sealing composition comprising: (1) a rapid curing liquid asphalt and (2) from about 0.1 to 13.5% by weight tall oil, preferably 1% by weight tall oil, based on the weight of rapid curing liquid asphalt.

The present invention also relates to a method for patching or repairing a roadway having a local discontinuity therein, comprising: (a) spreading out over the discontinuity and about the perimeter of the discontinuity, the above described coating or sealing composition containing the rapid curing liquid asphalt and tall oil to form a first coating, and (b) thereafter applying on the top of the first coating the above described patching composition.

The invention further provides a patch comprising a first layer of the above described rapid cure asphalt sealing composition and a second layer covering the first layer, the second layer comprising the above described medium cure asphalt patching composition.

The various binder compositions, patching compositions and rapid cure asphalt sealing compositions of the present invention as described above contain essentially no water and are not in the form of an emulsion such as a water-containing emulsion.

It is to be understood that both the foregoing general description and the following detailed description of this invention are exemplary, but are not restrictive of the invention.

DETAILED DESCRIPTION OF THE INVENTION

The asphalt binder compositions used in the practice of the present invention generally contain a medium curing liquid asphalt as their main component. The asphalt binder compositions generally contain from about 88% to about 99.9% by weight, and preferably from 95% to 99% by weight of medium curing liquid asphalt, based on the weight of medium cure liquid asphalt plus tall oil. Particularly good results have been achieved when the binder composition contains about 99% by weight of medium curing liquid asphalt.

The medium cure asphalts used in the present invention for binding purposes are usually designated with the letters MC, e.g., MC-250, MC-800 and MC-3000. These asphalts are generally blended, at the refinery, with petroleum fractions such as naphtha, kerosene or furnace oils, to yield the desired low viscosity "cutback grades" such as those defined hereinbefore. Exemplary properties of these "cutback grade" asphalts are set forth in Table I, below taken from The Asphalt Handbook, The Asphalt Institute, July 1962 Edition.

TABLE 1

| Characteristics | AASHO Test Method | ASTM Test Method | MC-250 | MC-800 | MC-3000 |
|---|---|---|---|---|---|
| Flash Point (Open Tag.) °F. | T79 | D 1310 | 150+ | 150+ | 150+ |
| Kinematic Viscosity at 140° F., c.s. | | D 445 | 250–500 | 800–1600 | 3000–6000 |
| Distillation- Distillate (percent of total distillate to 680° F.): | | | | | |
| To 437° F. | T78 | D 402 | 0.10 | — | — |
| To 500° F. | T78 | D 402 | 15–55 | 35– | 15– |
| To 600° F. | T78 | D 402 | 60–87 | 45–80 | 15–75 |
| Residue from distillation to 680° F., volume percent by difference | T78 | D 402 | 67+ | 75+ | 80+ |
| Tests on Residue from Distillation Penetration, 77° F., 100 g, 5 sec. | T49 | D 5 | 120–250 | 120–250 | 120–250 |
| Ductility, 77° F., cms | T51 | D 113 | 100+ | 100+ | 100+ |
| Solubility in Carbon Tetrachloride, % | T44 | D 4 | 99.5+ | 99.5+ | 99.5+ |

TABLE 1-continued

| Characteristics | AASHO Test Method | ASTM Test Method | MC-250 | MC-800 | MC-3000 |
|---|---|---|---|---|---|
| Water, % | T55 | D 95 | 0.2— | 0.2— | 0.2— |

The particular medium cure asphalt used is largely dependent upon ambient temperatures. For example, with warm weather it would be desired to use a medium cure asphalt exhibiting a high viscosity, such as MC-800 or MC-3000 whereas in cold weather, it would be desired to use a medium cure asphalt exhibiting a low viscosity, such as MC-250.

The asphalt binder composition further comprises tall oil. The tall oil promotes the adhesion of the binder composition, when admixed with an aggregate material, to the aggregate particles and to the existing roadway being patched or repaired. The tall oil aids the asphalt to set up and aids the binder composition in releasing from vehicle tires. Generally, between about 0.1 and 13.5%, and preferably between about 0.5 and 5% by weight of tall oil is present in the asphalt binder compositions of the present invention, based on the weight of the medium cure liquid asphalt. Most preferably, the tall oil is present in an amount of between 0.75 to 3% by weight. Particularly good results are obtained when tall oil is present at 1% by weight of the medium cure liquid asphalt.

The primary source of tall oil used in the practice of the present invention is from pine trees. Besides cellulose, tall oil contains fatty acids, esters, rosin acids, sterols, terpenes, carbohydrates and lignin. These are separated when wood is converted to paper pulp by the sulfide or Kraft process. The acids are then neutralized in an alkaline digestion liquor. The mixture of rosin and fatty acid soap are recovered by subsequent acidification which releases free rosin and fatty acids, the major constituents of tall oil.

Particularly preferred tall oils useful in the practice of this invention include tall oils that contain from about 12 to about 28% by weight rosin acids, from about 68 to about 86% by weight fatty acids, and from about 2 to about 30% by weight of unsaponifiables. An example of a tall oil useful in the practice of this invention contains 70.4% fatty acids, 28.0% rosin acids and 1.6% unsaponifiables. This tall oil exhibits a minimum acid number of 180 and a saponification number of 193. Best results are obtained with a tall oil containing 86% fatty acids, 12% rosin acids and 2.0% unsaponifiables. Other properties of this tall oil are set forth in Table 2, below.

TABLE 2

| SPECIFICATIONS | | |
|---|---|---|
| Acid No. | 190 Minimum | ASTM D 803 |
| Rosin Acid | 15% Maximum | ASTM D 1240 |
| Unsaponifiable | 3.0 Maximum | ASTM D 803 |
| Color (Gardner) | 7 Maximum | ASTM 1544-68 |
| TYPICAL PROPERTIES | | |
| Saponification No. | 194.5 | ASTM D 803 |
| Iodine Value | 134 | ASTM D 1959 |
| Viscosity (Gardner-Holdt, 250° C.) | A-2 | ASTM D 803 |
| Specific Gravity 25° C./25° C. | 905 | |
| Flash Point (C.O.C.) | 405° F. | ASTM D 92 |
| Fire Point (C.O.C.) | 435° F. | ASTM D 92 |
| Titer | 3° C. | ASTM D 1982 |
| TYPICAL COMPOSITION | | |
| Fatty Acids, % | 86 | ASTM D 803 |

TABLE 2-continued

| Rosin Acids, % | 12 | ASTM D 1240 |
|---|---|---|
| Unsaponifiables, % | 2.0 | ASTM D 803 |

Rosin acids in tall oil present generally include pimaric acid, palustric acid, 1-pimaric acid, levopimaric acid, isopimaric acid, abietic acid, dehydroabetic acid and neoabietic acids.

Other tall oil products can also be used, such as, for example, crude tall oil, tall oil head, distilled tall oil, tall oil pitch and the like.

In addition to the tall oil and medium cure liquid asphalt components, the asphalt binder composition also contains an effective amount of an organopolysiloxane fluid that is present in an amount sufficient to promote the release of tires of motor vehicles coming into contact with the asphalt binder composition of the present invention. Organopolysiloxanes that may be used in the practice of this invention may be represented by the general formula:

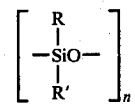

wherein R and R', which may be the same or different, each represent monovalent hydrocarbon radicals or halogenated monovalent hydrocarbon radicals having from 1 to 18 carbon atoms and n is a number greater than 20.

Radicals represented by R above are alkyl radicals, e.g., methyl, ethyl, propyl, butyl, octyl, dodecyl, and octadecyl; arylradicals, e.g., phenyl, diphenyl and naphthyl radicals; alkenyl radicals, e.g., vinyl, allyl radicals; cycloalkyl radicals, e.g., cyclobutyl, cyclopencyl and cyclohexyl; alkaryl radicals, e.g., totyl, xylyl, ethylphenyl; aralkyl radicals, e.g., benzyl, -phenylethyl, -phenylethyl and -phenylbutyl; and the halo substituted radicals enumerated above.

The organopolysiloxane may be any linear or branched chained compound having an average from 1.75 to 2.25 organic radicals per silicon atom. Generally, it is preferred that the organopolysiloxane be free of terminal hydroxyl groups. However, a small number of terminal-hydroxyl groups will not materially affect the release properties of the composition. The organopolysiloxane may have a minor amount of molecules having only one hydroxyl group or there may be a small number of molecules carrying an excess of two hydroxyl groups. However, as mentioned previously, it is preferred that the organopolysiloxane be substantially free of hydroxyl groups. In general, the polysiloxane fluids have a viscosity of between about 10,000 and 600,000 cs., and more preferably between about 50,000 and 400,000 cs., at 25° C.

The preferred organosiloxane useful in the practice of the invention is a dialkylsiloxane, with dimethyl silicone being particularly preferred.

Generally, the asphalt binder composition contains between about 0.0001 and 0.05 volume %, and preferably between about 0.000567 and 0.0385 volume %, of organopolysiloxane, based on the volume of medium curing liquid asphalt plus tall oil. Most preferred results are obtained when the asphalt binder composition contains about 0.0068% by volume of organopolysiloxane such as dimethyl silicone.

The patching compositions of the present invention generally comprise a mineral aggregate in combination with the previously defined asphalt binder composition. The asphalt binder composition is present in an amount sufficient to coat the mineral aggregates, and this amount generally is between 3 and 8% by weight and preferably between about 5.25% and 7% by weight, based on the total weight of the patching composition. The mineral aggregate particles of the present invention include calcium based aggregates, for example, limestone, siliceous based aggregates and mixtures thereof.

A preferred aggregate is bird's eye or rice stone aggregate which is a coarse mix limestone aggregate which exhibits the following sieve analysis

| Sieve Size | Cumulative % By Weight Passing Corresponding Sieve |
|---|---|
| ½" | 100% |
| ⅜" | 90–100% |
| #4 | 20–60% |
| #8 | 0–25% |
| #16 | 0–10% |
| #50 | 0–5% |
| #200 | 0–3% |

When using a coarse mix aggregate, it is preferred to use between about 5.25 and 6.5%, most preferably between 5.25 and 5.5% of asphalt binder composition based on the total weight of the patching composition.

A particularly preferred aggregate is a fine limestone aggregate which exhibits the following sieve analysis:

| Sieve Size | Cumulative % By Weight Passing Corresponding Sieve |
|---|---|
| ⅜" | 100% |
| #4 | 94.5% |
| #8 | 79.1% |
| #16 | 64.6% |
| #30 | 52.6% |
| #50 | 34.8% |
| #100 | 21.0% |
| #200 | 10.9% |

The limestone aggregates generally exhibit the following chemical analysis:

| | |
|---|---|
| Calcium Oxide is calculated to Calcium Carbonate | 62.78% |
| Magnesium Oxide is calculated to Magnesium carbonate | 14.67% |
| Silica | 16.44% |
| Iron | 1.01% |
| Aluminum | 1.26% |
| Calcium Oxide | 35.27% |
| Magnesium Oxide | 7.02% |
| Loss on ignition | 33.03% |
| Sulphur | .09% |

When using a fine mix aggregate, such as a fine mix limestone, it is preferred to use between about 6.5% and 7% of asphalt binder composition based on the total weight of the patching composition, with 7% being most preferred.

A particularly preferred mineral aggregate mixture comprises 20% by weight washed concrete sand and 80% by weight of a limestone aggregate wherein all of the limestone aggregate material passes through a #10 screen. The typical sieve breakdown of the washed concrete sand is:

| Sieve | Cumulative % By Weight Passing Corresponding Sieve |
|---|---|
| ⅜" | 100% |
| #4 | 96.2% |
| #8 | 82.1% |
| #16 | 68.6% |
| #30 | 50.9% |
| #50 | 20.3% |
| #100 | 4.0% |

This preferred mineral aggregate mixture is generally used with about 6.5% by weight of the asphalt binder composition, the weight being based upon the total weight of the patching composition.

Aggregates other than limestone can be used in the practice of the present invention. For example, gravel or crushed rock, volcanic ash, sand, pumice, burned clay, coal particles, slag, and the like can be used. Mixtures of different aggregates can also be used.

The asphalt binder compositions of the present invention are generally prepared by adding the tall oil and dimethyl silicone to the medium cure asphalt and mixing these ingredients together at a temperature of between 120° and 200° F., preferably in a heated tank. Preferably, the temperature should not exceed 170° F. when working with a medium cure liquid asphalt of designation MC-800. With a higher designation, such as MC-3000, higher temperatures can be used. Similarly, with a lower designation, lower temperatures are preferably used. The asphalt binder composition is constantly circulated at the elevated temperature for a period of time to ensure good mixing, and generally between 2 and 3 hours.

The asphalt binder compositions of the present invention can also contain various additives, such as nontoxic dyes, for example, a gasoline red dye which can be added in an amount of a few ounces (e.g., 1 to 8 ounces) per 5000 gallons of binder composition. Moreover, the asphalt binder composition can contain additives which promote the wetting of the asphalt binder composition to the aggregate. These additives can comprise, for example, fatty acids, such as long chain fatty acids, for example, oleic, stearic or cocoa fatty acids. The wetting additives preferably are used in amounts of from about 0.5 to 1.5%, based on the weight of the asphalt binder composition. A typical additive that has been used is known by the name Kling Beta KY modified additive, sold by Lancaster Chemical, New Jersey. The various additives are added to the asphalt and mixed therein together with the tall oil and organopolysiloxane, such as dimethyl silicone. The order of addition generally is immaterial.

The liquid asphalt binder composition is then applied to the mineral aggregate that is free of foreign or deleterious substances, such as surface moisture, preferably in a batch plant mixer, for a period of time sufficient to thoroughly coat the mineral aggregate particles. In the event that the mineral aggregate does contain surface moisture, the mineral aggregate is initially dried by heating the mineral aggregate at an elevated temperature up to 150° F. Mixing should be continuous until all aggregates are thoroughly coated with the binder composition.

A particularly preferred repair or patching composition, based on 1 ton of finished paving composition contains 1895 pounds of ¼ inch rice stone or ¼ inch birdseye limestone; 103.95 pounds of MC250 or MC800 asphalt, 1.5 pounds of distilled tall oil having the characteristics of Table 2 above, and 1 cc of dimethyl silicone. The dimethyl silicone can vary from about 5 drops to 10 cc for one ton of finished patching composition. The patching composition can also contain from 1 cc to 2 ounces of non-toxic dye and from 0.5 to 1.5 percent of a suitable wetting additive.

The resulting patching compositions may be either used immediately after preparation or stored for subsequent use at some future date, in view of its shelf life being greater than one year.

When using the patching compositions of the present invention for the repair of roads, having a local discontinuity therein, the discontinuity being in the form of utility cuts or damaged surface areas including potholes, cracks, surface wear and the like, a sealer composition preferably is initially applied over the discontinuity in an amount sufficient to cover the discontinuity and surrounding roadway. By surrounding roadway, it is intended to include the perimeter of the discontinuity and extending at least about one inch away from the discontinuity. The sealer composition prevents the penetration of water through the surface to the base and sub-base of the roadway which is being repaired.

In accordance with a preferred embodiment of the present invention, the sealer or coating composition comprises generally between 88 and 99.9% and preferably between 95 and 99% by weight of a rapid curing liquid asphalt based on the weight of rapid cure liquid asphalt plus tall oil, and between 0.1 and 13.5% by weight, and preferably between 0.5 and 5% by weight of tall oil, based on the weight of rapid curing liquid asphalt. Most preferably, the tall oil is present in an amount of between 0.75 and 3% by weight, with particularly good results being achieved when the tall oil is present at about 1% by weight.

Preferably, the sealer composition also contains an organopolysiloxane. The organopolysiloxane used in the sealer composition preferably is the same as used in the binder composition, and most preferably is dimethyl silicone. Preferably, the organopolysiloxane is used in an amount of between about 0.0001 to 0.05% by volume, based on the volume of rapid curing liquid plus tall oil and preferably in an amount of 0.0001 to 0.005% by volume. Particularly good results have been achieved using the organopolysiloxane in an amount of 0.00027% by volume which amounts to about 2 drops per 40 pounds (5 gallons) of the sealer composition. The sealing composition is liquid in hot and cold weather, sets up quickly when applied to a roadway, and cures in a few hours when applied to a roadway. The sealing composition can be prepared generally in the same manner as the asphalt binder composition by mixing the various ingredients together at a temperature sufficient to maintain liquidity and generally between about 140° to 220° F. for about 2 hours. The sealing composition can then be packaged.

The rapid curing asphalts used in the present invention are conventional asphalts that are generally designated in the art with the letters RC, e.g., RC-250, RC-800 and RC-3000. These asphalts are generally blended, at the refinery, in the same manner as the medium curing asphalts and differ from the medium curing liquid asphalts in the required time required to harden or otherwise set.

The properties of two rapid curing asphalts are set forth in Table 3, below:

TABLE 3

| | Sample 1 RC-250 | Sample 2 RC-800 |
|---|---|---|
| Gravity A.P.I. | 15.4 | 13.2 |
| Specific Gravity at 60° F. | 0.9632 | 0.9779 |
| Flash, °F. | 98 | 100 |
| Furol Viscosity at 140° F. | 170 | 171 |
| Kinematic Viscosity @ 140° F. | 340 | 1370 |
| Wt./Gallon | 8.021 | 8.144 |
| DISTILLATION: | | |
| DISTILLATION: % of Total Distillate to 680° F. | | |
| 0–320° F. | 7.0 | |
| 0–374° F. | 55.8 | 35.7 |
| 0–437° F. | 79.1 | 64.3 |
| 0–500° F. | 86.0 | 82.1 |
| 0–600° F. | 95.3 | 96.4 |
| Residue, Vol. % by Difference | 78.5 | 86.0 |
| TESTS OF RESIDUE FROM DISTILLATION: | | |
| Penetration at 77° F./100 Grams/5 Sec. | 117 | 116 |
| Ductility at 77° F./5 cm. per min., cm | 100+ | 100+ |
| Softening Point °F. | | |
| Solubility in Trichloroethylene | 99.9 | 99.9 |

The sealer composition can be applied by conventional coating techniques including, for example, brushing, rolling, and the like.

Once the sealer composition has been spread over the complete discontinuity and that portion of the roadway immediately adjacent the discontinuity, the patching composition of the present invention is then applied in an amount sufficient to fill the discontinuity to a level at least equal to the surrounding roadway and preferably at least one inch above the surrounding roadway. The patching composition is generally applied in the form of a rectangle or square for aesthetic purposes. Once applied, the patching composition is then feathered automatically by the traffic passing thereover.

As noted hereinbefore, the sealer composition and patching composition can be satisfactorily used for the repair of utility cuts. Such utility cuts are generally made for the repair of gas, electric and water line repairs. After completing the utility repair, the earth is then compacted, crushed rock is placed thereover and compacted, followed by the application of the sealer composition, and finally, the patching composition of the present invention. The use of the sealer composition and patching composition provides a permanently sealed, aesthetically pleasing, economical and time saving repair of a roadway.

In the conventional repair of utility cuts, a temporary repair is generally made in which the roadway is first dug out, the earth is then put back, and a temporary pavement is then applied. A number of days later, the temporary repair is replaced with a permanent repair in which a concrete base is applied, and then a hot asphalt pavement is applied by a hot crew. The permanent repair is applied to a large area which is significantly larger than the area of the utility cut itself. Thus, conventional permanent repairs of utility cuts usually extend for one-half the width or the full width of the roadway being repaired, and extend a significant distance (e.g. three or four feet) along the length of the roadway. In contrast, when repairing utility cuts in accordance with the present invention, there is no need to apply a temporary repair, and the area which is repaired need by only the area of the utility cut itself plus whatever small area is needed to achieve an aesthetic effect by, for example, squaring the repair. The practice of the present invention thus allows significant savings to be achieved in time and costs for repair of utility cuts.

In the conventional repair of potholes in an aesthetic manner, the pot hole is squared or otherwise shaped by cutting out good pavement material and then applying hot asphalt in the area of the original pot hole and in the enlarged area where the good material was cut. Moreover, the cutting of good material results in a further joint area where water can seep and further destroy the roadway because of the perma-frost effect. In contrast, in the present invention, there is no need to cut out good material, but simply to apply the sealer composition in an aesthetic manner to the pot hole and surrounding roadway, as discussed above, and then apply the patching composition.

It is noted that in the preferred embodiments of the present invention, both the sealer composition and patching composition are used for the repair of a discontinuity. However, it is also possible to make such a repair with the use of the patching composition alone which is applied to the discontinuity and the roadway immediately adjacent the discontinuity.

It is understood that the compositions of the present invention, as well as the embodiments relating to the process of repairing roadways, is applicable to roadways such as asphalt, concrete or dirt roadways.

The use of the patching compositions in accordance with this invention can be used to fill a discontinuity by the simple means of a shovel and without the necessity of expensive equipment. The road repair method and compositions of the present invention facilitate instant, permanent, economical paving repairs that can be performed year round, winter or summer, or both wet or dry surfaces.

The patching composition before it is applied to the roadway flows freely, is flexible, has a wet oatmeal like consistency, and can be stored and used at temperatures of from about below 0° F. (e.g. −25° F.) to above 100° F. (e.g. 110° F.), and is easily workable at these conditions. As noted herein before, when applied to roadways, the patching composition is both self-feathering and self-adhering. In wet or dry weather it adheres to bituminous concrete, concrete, steel, dirt or wooden surfaces and sets up in a hard and permanent manner. Repairs in accordance with the present invention withstand immediate traffic. In fact, the more traffic passing over the repair, the stronger the road repair composition becomes. This pressure, together with oxidation, sunlight, rain, increase of viscosity due to the evaporation of solvents, and crystallization of the patching composition, facilitates the rapid set up of the patching composition once used.

To use the patching composition, all that needs to be done is to shovel the material into the hole and level it, about one inch above the exising paving. It does not require skilled labor such as is used in the hot asphalt process. The patching composition provides for instant, permanent, economical paving repairs, year round, winter or summer and works on wet or dry pavement. No raking, bonding agents, or feathering is required, just leveling. Further, there is no need for rollers or tampers. Traffic compacts and feathers the material making it capable of instant paving repairs. There is no need for waiting time, curing time, or compacting time, since the road repair composition withstands immediate traffic. The greater amount of traffic, the faster it sets up and the stronger the road repair composition becomes.

The patching composition has an ability to maintain its freshness, ease of workability, exceptional ability to adhere to the old paving even when the chuck hole is filled with water and as ease of handling even without skilled labor. It has an ability to tightly stick to the old pavement and at the same time, rubber tires and synthetic tires do not stick to the patching composition, but are released therefrom without pulling or breaking up the patching composition. Under pressure and traffic, the more traffic the better, the road repair composition begins its setting up period. The material feathers out automatically so that the material seals itself against the edges of the pothole. After a period of time, for example, 24 to 48 hours, the patching composition becomes as strong and hard as the surrounding surface. Oxidation over further periods of time completes the hardening process.

It is further noted that the patching compositions of the present invention can be packaged and used for small repairs or they can be stored in bulk stock piles, in maintenance yards, for periods greater than one year without the separation of ingredients which is generally experienced with prior art emulsion-type patching compositions which render such emulsion type compositions useless for their intended purpose. The patching composition has a shelf life of at least one year when in paper bags having a polyethylene middle lining, and at least a year when stock piled in the open, even though it is exposed to air, sunshine and rain.

For special purposes, special aggregates can be added to the patching composition, such as light absorbing chemicals which will absorb light during the day and radiate light at night; glass, reflective materials, or color indicators similarly, magnetic or radioactive signatures or markers can easily be incorporated into the patching composition during or after it is manufactured.

It will be understood that the above description of the present invention is susceptible to various modifications, changes and adaptions, and the same are intended to be comprehended within the meaning and range of equivalents of the appended claims.

What is claimed is:

1. A non-emulsified asphalt binder composition comprising: (1) a medium curing liquid asphalt; (2) from about 0.1 to 13.5% tall oil based on the weight of medium curing asphalt and (3) 0.0001 to 0.05% by volume of an organopolysiloxane fluid, based on the volume of medium curing liquid asphalt plus tall oil.

2. The asphalt binder composition of claim 1, wherein said tall oil consists essentially of about 12 to 28% by weight rosin acids, from about 68 to 86% by weight fatty acids, and from about 2 to about 30% by weight unsaponifiables.

3. The asphalt binder composition of claim 2, wherein said tall oil consists essentially of 70.4% by weight fatty acids, 28.0% by weight rosin acids and 1.6% by weight unsaponifiables.

4. The asphalt binder composition of claim 3, wherein said tall oil is present in an amount of about 1% by weight, based on the weight of the medium curing liquid aspahlt.

5. The asphalt binder composition of claim 1, wherein said organopolysiloxane is a compound of the formula:

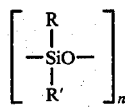

wherein R and R' are each monovalent hydrocarbon radicals or halogenated monovalent hydrocarbon radicals having from 1 to 18 carbon atoms, and n is a number greater than 20.

6. The asphalt binder composition of claim 5, wherein each R is an alkyl group.

7. The asphalt binder composition of claim 6, wherein said organopolysiloxane is dimethyl silicone.

8. The asphalt binder composition of claim 7, wherein said tall oil consists essentially of 70.4% by weight fatty acids, 28.0% by weight rosin acids and 1.6% by weight unsaponifiables.

9. A patching composition useful for the repair of roads comprising 97 to 92% by weight mineral aggregate particles and 3 to 8% by weight of the asphalt binder composition of claim 1.

10. The patching composition of claim 9, containing between about 5.25 and 7% by weight of said asphalt binder composition.

11. The patching composition of claim 10, wherein said mineral aggregate is a fine limestone aggregate, and said asphalt binder composition is present in an amount of about 7.0% by weight.

12. The patching composition of claim 10, wherein said mineral aggregate is a coarse limestone aggregate and said asphalt binder composition is present in an amount between 5.25 and 6.25% by weight.

13. The patching composition of claim 10, wherein said mineral aggregate comprises 20% by weight washed concrete sand and 80% by weight of limestone aggregate, wherein all of said limestone aggregate passes through a #10 screen, and said tall oil consists essentially of 70.4% by weight fatty acids, 28.0% by weight rosin acids, and 1.6% by weight unsaponifiables.

14. The patching composition of claim 13 comprising 0.0068% by volume dimethylsilicone as said organopolysiloxane, based on the volume of said medium cure liquid asphalt plus tall oil.

15. In a method for the preparation of the patching composition of claim 9, comprising:
  initially heating said asphalt binder composition at a temperature up to 200° F.; and
  mixing said asphalt binder composition with said mineral aggregate having a surface free of moisture, for a period of time sufficient to thoroughly coat the particles of mineral aggregate.

16. The method of claim 15, wherein said asphalt binder composition comprises 1% by weight of tall oil, 0.0068% by weight dimethylsiloxane as said organopolysiloxane, and remainder of medium curing liquid asphalt.

17. The method of claim 16, wherein said mineral aggregate comprises 20% by weight washed concrete sand and 80% by weight limestone aggregate wherein all of said limestone aggregate passes through a #10 screen.

18. The method of claim 15 comprising heating said mineral aggregate prior to mixing with said asphalt binder composition so as to remove all surface moisture from said mineral aggregate particles.

19. A non-emulsified sealing composition comprising a rapid curing liquid asphalt and from about 0.1 to 13.5% tall oil, based on the weight of the rapid curing liquid asphalt.

20. The sealing composition of claim 19 containing between about 0.5 and 5% by weight tall oil.

21. The sealing composition of claim 20, and further containing to between about 0.0001 to 0.05% by volume of an organopolysiloxane fluid, based on the volume of rapid curing liquid asphalt plus tall oil.

22. A patch comprising (a) a first layer of a composition comprising a rapid curing liquid asphalt and from 0.1 to 13.5% by weight tall oil based on the weight of the rapid curing liquid asphalt, and (b) a second layer covering said first layer, said second layer comprising a patching composition as defined in claim 9.

23. The patch of claim 22, wherein said mineral aggregate particles are limestone particles.

24. The asphalt binder composition according to any one of claims 1, 2, 3, 4 or 5, wherein the binder composition contains no water.

25. The patching composition according to any one of claims 9, 10, 11, 12 or 13, wherein the patching composition contains no water.

26. The patching composition according to claim 9, wherein the mineral aggregate is a fine limestone aggregate.

27. The patching composition according to claim 9, wherein the mineral aggregate is a coarse limestone aggregate.

28. The sealing composition according to any one of claims 19, 20 or 21, wherein the sealing composition contains essentially no water.

* * * * *